US009643665B2

United States Patent
Hommes

(10) Patent No.: US 9,643,665 B2
(45) Date of Patent: May 9, 2017

(54) ADJUSTABLE SPLITTER FOR A MOTOR VEHICLE

(71) Applicant: GM GLOBAL TECHNOLOGY OPERATIONS LLC, Detroit, MI (US)

(72) Inventor: Daniel J. Hommes, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/837,438

(22) Filed: Aug. 27, 2015

(65) Prior Publication Data

US 2017/0057566 A1 Mar. 2, 2017

(51) Int. Cl.
*B62D 35/00* (2006.01)
*B62D 37/02* (2006.01)
*G05D 3/10* (2006.01)
*G07C 5/08* (2006.01)

(52) U.S. Cl.
CPC ............. *B62D 37/02* (2013.01); *B62D 35/00* (2013.01); *G05D 3/10* (2013.01); *G07C 5/0808* (2013.01)

(58) Field of Classification Search
CPC ....... B62D 35/005; B62D 37/02; B62D 35/00
USPC ............... 296/180.1, 180.5; 701/49
See application file for complete search history.

(56) References Cited

U.S. PATENT DOCUMENTS

| | | | |
|---|---|---|---|
| 8,210,600 B1 * | 7/2012 | Verhee | B62D 35/005 296/180.1 |
| 2009/0115221 A1 * | 5/2009 | Shinedling | B62D 37/02 296/180.5 |
| 2015/0232138 A1 * | 8/2015 | Parry-Williams | B62D 35/02 296/180.5 |

* cited by examiner

*Primary Examiner* — Thomas G Black
*Assistant Examiner* — Wae Louie
(74) *Attorney, Agent, or Firm* — Quinn IP Law

(57) ABSTRACT

A splitter system for a vehicle includes a splitter body having a first splitter-body side and a second splitter-body side. The vehicle includes a vehicle body arranged along a longitudinal body axis and having a first vehicle body end configured to face oncoming ambient airflow. The splitter body is mounted at the first vehicle body end to generate an aerodynamic downforce thereon when the vehicle is in motion. The splitter system has a first winglet operatively connected to a first splitter-body side and a second winglet operatively connected to a second splitter-body side, wherein the first and second winglets are configured to control movement of the ambient airflow relative to the splitter body. A mechanism is configured to selectively shift each of the winglets in a direction transverse to the longitudinal body axis, to thereby adjust the aerodynamic downforce generated by the splitter body on the first vehicle body end.

16 Claims, 2 Drawing Sheets

ADJUSTABLE SPLITTER FOR A MOTOR VEHICLE

TECHNICAL FIELD

The disclosure relates to an adjustable splitter for enhancement of aerodynamics of a motor vehicle.

BACKGROUND

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in high-performance vehicles in order to improve vehicle traction and cornering abilities. The study is typically used to shape vehicle bodywork for achieving a desired compromise among the above characteristics for specific vehicle use.

A splitter is an aerodynamic device sometimes used to increase the amount of downforce at the front of the car. Typically, the airstream is brought to stagnation at the front of the vehicle above the splitter by an air dam, causing an area of high pressure. Below the splitter, the airstream is redirected away from the stagnation zone and is accelerated, causing the pressure to drop. Thus reduced, the pressure below the splitter combined with the high pressure above the splitter, creates downforce at the front end of the vehicle body. Generally, the larger the area of the splitter, the more downforce is generated at the front of the vehicle.

SUMMARY

A splitter system for a vehicle includes a splitter body having a first splitter-body side and a second splitter-body side. The vehicle includes a vehicle body arranged along a longitudinal body axis and having a first body end configured to face oncoming ambient airflow. The splitter body is configured to be mounted at the vehicle's first body end to generate an aerodynamic downforce thereon when the vehicle is in motion. The splitter system has a first winglet operatively connected to a first splitter-body side and a second winglet operatively connected to a second splitter-body side, wherein the first and second winglets are configured to control movement of the ambient airflow relative to the splitter body. A mechanism is configured to selectively shift each of the winglets in a direction transverse to the longitudinal body axis, to thereby adjust the aerodynamic downforce generated by the splitter body on the vehicle's first body end.

The splitter system may also include an electronic controller configured to regulate the mechanism.

The vehicle may also include a road wheel and the splitter system may further include a first sensor configured to detect a rotating speed of the road wheel and communicate the detected rotating speed of the road wheel to the controller.

The splitter system may also include a second sensor configured to detect a yaw rate of the vehicle body and communicate the detected yaw rate to the controller.

The splitter system may also include a third sensor configured to detect a velocity of ambient airflow relative to the vehicle and communicate the detected velocity of the ambient airflow to the controller.

The vehicle may additionally include a steering wheel and the splitter system may further include a fourth sensor configured to detect an angle of the steering wheel.

The controller may be configured to selectively shift, via the mechanism, at least one of the first and second winglets in a direction transverse to the longitudinal body axis during vehicle cornering in response to the detected yaw rate, the detected angle of the steering wheel, and at least one of the detected rotating speed of the road wheel and velocity of the ambient airflow, to thereby vary the aerodynamic downforce on the vehicle's first body end and control the detected yaw rate.

The controller may be additionally programmed to selectively shift, via the mechanism, at least one of the first and second winglets in a direction transverse to the longitudinal body axis according to a lookup table establishing a correspondence of magnitude of shift of each of the first winglet and the second winglet and a magnitude of the aerodynamic downforce generated by the splitter on the vehicle's first body end.

The mechanism may include at least one of a linear actuator, a rotary actuator, and an electric motor.

A vehicle employing such a splitter system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
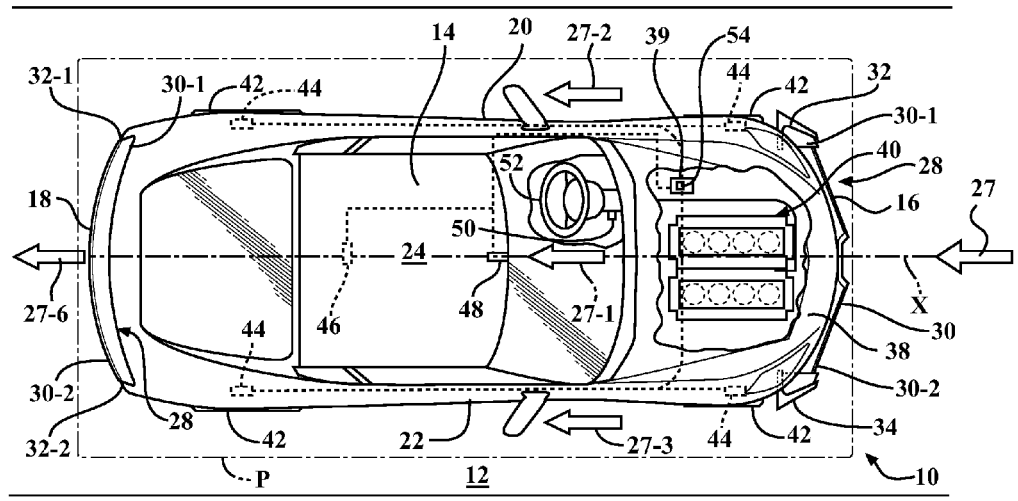
FIG. 1 is a schematic top view of a vehicle having a vehicle body arranged in a body plane along a longitudinal axis, and having a splitter system with movable winglets according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion (not shown).

The left side 20 and right side 22 are disposed generally parallel to each other and with respect to a virtual longitudinal axis X of the vehicle 10, and span the distance between the front end 16 and the rear end 18. The body plane P is defined to include the longitudinal axis X. A passenger compartment (not shown) of the vehicle 10 is generally bounded by the front and rear ends 16, 18 and the left and right sides of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As the vehicle 10 moves relative to the road surface 12, the ambient airflow 27 passes around the vehicle body 14 and splits into respective first airflow portion 27-1, second airflow portion 27-2, third airflow portion 27-3, and fourth airflow portion (not shown), that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and the fourth airflow portion that passes under the vehicle body 14, between the underbody portion and the road surface 12, but is not specifically shown. As understood by those skilled in the art, the recirculating airflow region 27-6 is generally caused at elevated vehicle speeds by the flow of surrounding air around the six body sides of the vehicle body 14.

Figure 2:
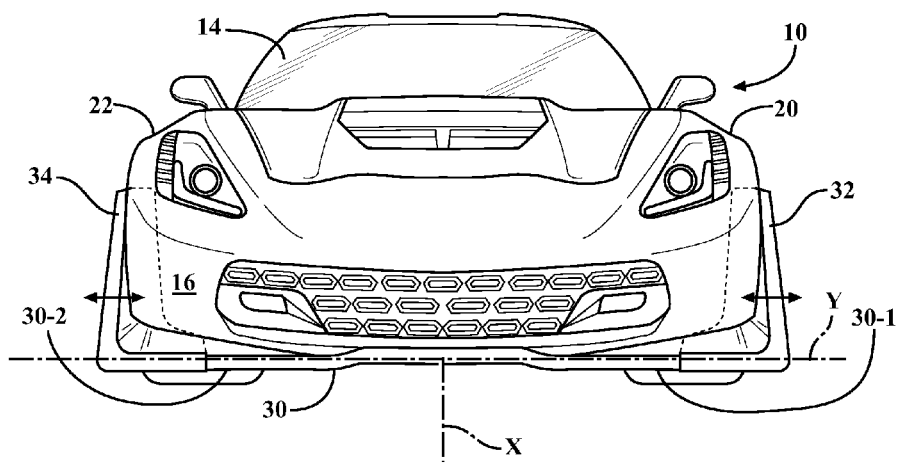
FIG. 2 is a schematic front view of the vehicle shown in FIG. 1 according to the disclosure.

As shown in FIGS. 1 and 2, the vehicle 10 also includes a splitter system 28. The splitter system 28 includes a splitter body 30 arranged along a splitter-body axis Y and configured to control a movement of the ambient airflow 27 along the longitudinal body axis X of the vehicle body 14. As shown, the splitter body 30 is mounted at the front end 16 to generate an aerodynamic downforce $F_D$ on the vehicle body 14 when the vehicle 10 is in motion. As understood, a pressure differential between the first airflow portion 27-1 and the fourth airflow portion 27-4 generated by the splitter body 30, with the pressure bias favoring the first airflow portion, determines the amount of aerodynamic downforce $F_D$ acting on the front end 16. The splitter body 30 has a first splitter-body side 30-1 and a second splitter-body side 30-2.

The splitter system 28 also includes a first winglet 32 operatively connected to the first splitter-body side 30-1 and a second winglet 34 operatively connected to the second splitter-body side 30-2. Each winglet 32, 34 is arranged substantially transversely with respect to the splitter-body axis Y and incorporates a respective winglet wall 32-1 and a winglet wall 34-1, each arranged substantially vertically relative to the road surface 12 and facing the incident ambient airflow 27. As a result, the winglet walls 32-1, 34-1 facilitate trapping respective pockets of air 27-2A, 27-3A between the respective winglets 32, 34 and the vehicle body 14 when the vehicle 10 is in motion. Consequently, the first and second winglets 32, 34 are configured to control movement of the second and third airflow portions 27-2, 27-3 relative to the splitter body 30 and around the left side 20 and the right side 22 of the vehicle body 14.

Figure 3:
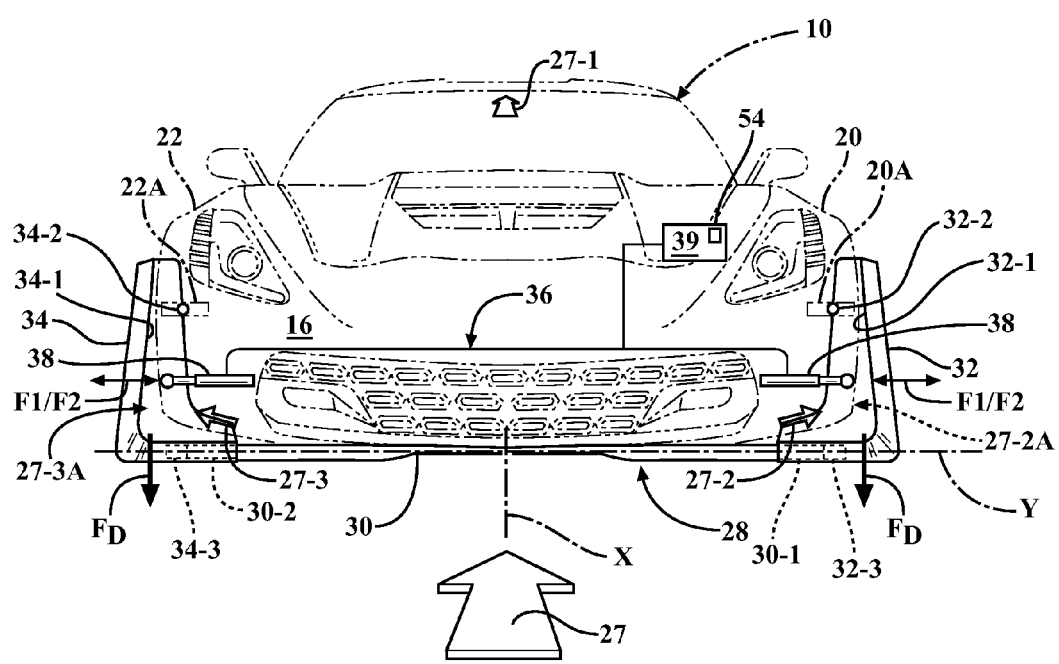
FIG. 3 is a schematic phantom view of the vehicle shown in FIGS. 1-2 along with a detailed view of the splitter system according to the disclosure.

As shown in FIG. 3, the splitter system 28 also includes a mechanism 36 configured to selectively shift each of the first winglet 32 and the second winglet 34 along the splitter-body axis Y, i.e., in a direction substantially transverse to the longitudinal body axis X. As a result, the mechanism 36 can selectively shift the first and second winglet 32, 34 toward and away from the respective first and second lateral body sides 20, 22. Such selective shifting of the first winglet 32 and the second winglet 34 changes the winglets' position relative to the first and second lateral body sides 20, 22 to increase or decrease the exposed areas of the winglet walls 32-1, 34-1. In turn, the regulated exposed areas of the winglet walls 32-1, 34-1 vary the size of the respective pockets of air 27-2A, 27-3A and thereby adjust a magnitude of the aerodynamic downforce $F_D$ generated by the splitter body 30 on the first body end 16.

To facilitate being shifted along the splitter-body axis Y, each of the first winglet 32 and the second winglet 34 can be movably mounted on the splitter body 30 proximate the first end 30-1 and second end 30-2, respectively. For example, features 32-2, 34-2 can be included on the respective first and second winglets 32, 34 for engagement with complementary channels 20A and 22A on the left and right sides 20, 22 and sliding movement relative thereto. Also, the ends 30-1, 30-2 of the splitter body 30 may be configured to slide within respective channels 32-3, 34-3 on the first and second winglets 32, 34. Conversely, the ends 30-1, 30-2 of the splitter body 30 may include channels to accept some specifically shaped feature (not shown) on each of the first and second winglets 32, 34 for sliding motion of the winglets relative to the splitter body.

The mechanism 36 can include a set of individual devices 38 for shifting each winglet 32, 34 toward and away from the respective first and second lateral body sides 20, 22. Such a set of individual devices 38 can have one device 38 specifically for driving the first winglet 32 and another device 38 specifically for driving the second winglet 34. Each device 38 may be positioned between the vehicle body 14 and the respective first and second winglets 32, 34 for generating movement of the first and second winglets, such as a linear actuator, a rotary actuator, and/or an electric motor (not shown in detail, but understood by those skilled in the art). As shown in FIG. 3, each device 38 may be configured to apply a force F1 to shift the respective first and second winglets 32, 34 in one direction and an opposite force F2 to shift the subject winglets in the opposite direction.

As shown in FIGS. 1-3, the vehicle also includes an electronic controller 39 configured, i.e., constructed and programmed, to regulate the mechanism 36. The controller 39 may be configured as a central processing unit (CPU) configured to regulate operation of an internal combustion engine 40 (shown in FIG. 1), a hybrid-electric powertrain (not shown), or other alternative types of powerplants, as well as other vehicle systems, or a dedicated controller. In order to appropriately control operation of the mechanism 36, the controller 39 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 39 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 39 may also include a floppy disk, a flexible disk, hard disk, magnetic tape, any other magnetic medium, a CD-ROM, DVD, any other optical medium, etc. The controller 39 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 39 or accessible thereby may be stored in the memory and automatically executed to provide the required functionality.

As shown in FIG. 1, the vehicle 10 also includes road wheels 42. A plurality of first sensors 44 may be arranged on the vehicle body 14 for detecting rotating speeds of each road wheel 42. Each first sensor 44 may also be configured to communicate the detected rotating speed of the respective road wheel 42 to the controller 39, while the controller may be configured to correlate the data received from the respective first sensors to road speed of the vehicle 10. The vehicle 10 may also include a second sensor 46 configured to detect a yaw moment or rate on the vehicle body 14 relative to the road surface 12 and communicate the detected yaw rate to the controller 39. The vehicle may additionally include a third sensor 48 configured to detect a velocity of ambient airflow 27 relative to the vehicle 10 and communicate the detected velocity of the ambient airflow to the controller 39. The third sensor 48 may be a pitot tube configured to detect a pressure of the ambient airflow 27 at a specific location relative to the vehicle body 14, and the controller 39 can correlate the measured pressure to airflow velocity.

The controller 39 is additionally configured to selectively shift, via the mechanism 36, each of the first and the second winglets 32, 34 toward and away from the respective first and second lateral body sides 20, 22 along the splitter-body axis Y during cornering of the vehicle 10 in response to the yaw rate detected by the second sensor 46. For example, if the vehicle 10 is negotiating a high-g turn, the first and the second winglets 32, 34 can be extended away from the respective body sides 20, 22 to increase the downforce $F_D$ acting on the front end 16 and enhance the ability of the vehicle to maintain the selected line through the turn. Accordingly, the position of the first and the second winglets 32, 34 can be regulated via the controller 39 along the longitudinal body axis X and relative to the respective body sides 20, 22 proportionately to the yaw rate generated during cornering of the vehicle 10 by shifting the subject winglets.

Furthermore, the controller 39 may be configured to selectively shift, via the mechanism 36, each of the first and the second winglets 32, 34 toward and away from the respective first and second lateral body sides 20, 22 along the splitter-body axis Y in response to the rotating speeds of the road wheels 42 detected via the first sensor 44 and/or the velocity of the ambient airflow 27 detected via the third sensor 48. For example, if the vehicle 10 is traveling at an elevated road speed, the first and the second winglets 32, 34 can be extended away from the respective body sides 20, 22 to increase the downforce $F_D$ acting on the front end 16 and enhance the stability and steering response of the vehicle at such conditions. On the other hand, the first and the second winglets 32, 34 can be retracted toward the respective body sides 20, 22 to decrease the downforce $F_D$, and, as a result, decrease aerodynamic drag of the vehicle 10.

The controller 39 may also be programmed to determine a slip of the vehicle 10 relative to the road surface 12. The slip of the vehicle 10 may include a measure of how much each of the road wheels 42 has slipped in a direction that is generally perpendicular to the longitudinal vehicle axis X, which identifies that the vehicle has deviated from an intended direction or path along the road surface 12. The intended direction of the vehicle 10 may be identified by the steering wheel angle, which can be detected by a fourth sensor 50 operatively connected to a steering wheel 52 (shown in FIG. 1) and communicated to the controller 39. Furthermore, the controller 39 may be programmed to compare the determined steering wheel angle and yaw rate to determine how much the vehicle has deviated from its intended direction or path.

The controller 39 may also be programmed to control the slip of the vehicle 10 relative to the road surface 12 by controlling position of the first and the second winglets 32, 34 relative to the respective body sides 20, 22 via the mechanism 36 in response to how much the vehicle has deviated from its intended path. The employed change in the position of the first and the second winglets 32, 34 then urges the vehicle 10 to return to the actual vehicle heading to the desired heading being commanded by an operator of the vehicle at the steering wheel 52. Additionally, two third sensors 48 may be arranged on the splitter body 30, one such third sensor on the first end 30-1 and another third sensor on the second end 30-2 (not shown). The controller 39 may then be configured to vary the position of the first and the second winglets 32, 34 relative to the respective body sides 20, 22 in response to a determined differential between air velocity measurements at each third sensor 48 as the vehicle 10 enters and negotiates a turn to vary the downforce $F_D$ on the vehicle body 14.

The controller 39 may be additionally programmed with a lookup table 54 establishing correspondence between the previously described vehicle parameters—the vehicle slip, yaw rate, vehicle road speed, and/or velocity of the airflow and appropriate position of the winglets 32, 34 for affecting appropriate regulation of the mechanism 36. Specifically, the lookup table 54 can establish a correspondence of magnitude of shift for each of the first winglet 32 and the second winglet 34 and a magnitude of the aerodynamic downforce $F_D$ generated by the splitter system 28 on the front body end 16. The lookup table 54 may be developed empirically during validation and testing of the vehicle 10. As the position of the first and the second winglets 32, 34 is varied relative to the respective body sides 20, 22 during the cornering event or at elevated road speeds, the splitter system 28 can adjust the downforce $F_D$ at the front end of the vehicle body 14 to affect the dynamic behavior of the vehicle 10.

Accordingly, control of the position of the first and the second winglets 32, 34 may be employed to maintain contact of the vehicle 10 with the road surface 12 at elevated speeds by countering aerodynamic lift of the vehicle body 14 in response to the velocity of ambient airflow 27 detected by the third sensor 48. Additionally, control of the position of the first and the second winglets 32, 34 may be employed to aid handling of the vehicle 10 in order to maintain the vehicle on its intended path by countering and controlling the yaw moment acting on the vehicle body 14 as detected by the second sensor 46.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A splitter system for a vehicle having a road wheel, and a vehicle body arranged along a longitudinal body axis and including a first vehicle body end configured to face oncoming ambient airflow when the vehicle is in motion relative to a road surface, the splitter system comprising:

a splitter body having a first splitter-body side and a second splitter-body side and configured to be mounted at the first vehicle body end and generate an aerodynamic downforce on the first vehicle body end when the vehicle is in motion;

a first winglet operatively connected to the first splitter-body side and a second winglet operatively connected to the second splitter-body side, wherein each of the first and second winglets is configured to control movement of the ambient airflow relative to the splitter body;

a mechanism configured to selectively shift each of the first winglet and the second winglet in a direction transverse to the longitudinal body axis to thereby adjust a magnitude of the aerodynamic downforce generated by the splitter body on the first vehicle body end;

an electronic controller configured to regulate the mechanism; and a first sensor configured to detect a rotating speed of the road wheel and communicate the detected rotating speed of the road wheel to the controller.

2. The splitter system according to claim 1, further comprising a second sensor configured to detect a yaw rate of the vehicle body and communicate the detected yaw rate to the controller.

3. The splitter system according to claim 2, further comprising a third sensor configured to detect a velocity of ambient airflow relative to the vehicle and communicate the detected velocity of the ambient airflow to the controller.

4. The splitter system according to claim 3, wherein the vehicle includes a steering wheel, the splitter system further comprising a fourth sensor configured to detect an angle of the steering wheel.

5. The splitter system according to claim 4, wherein the controller is configured to selectively shift, via the mechanism, at least one of the first and second winglets in a direction transverse to the longitudinal body axis during vehicle cornering in response to the detected yaw rate, the detected angle of the steering wheel, and at least one of the detected rotating speed of the road wheel and velocity of the ambient airflow, to thereby vary the aerodynamic downforce on the first vehicle body end and control the detected yaw rate.

6. The splitter system according to claim 5, wherein the controller is programmed to selectively shift, via the mechanism, at least one of the first and second winglets in a direction transverse to the longitudinal body axis according to a lookup table establishing a correspondence of magnitude of shift of each of the first winglet and the second winglet and a magnitude of the aerodynamic downforce generated by the splitter on the first vehicle body end.

7. The splitter system according to claim 1, wherein the mechanism includes at least one of a linear actuator, a rotary actuator, and an electric motor.

8. A vehicle comprising:
a road wheel;
a vehicle body arranged along a longitudinal body axis and having a first vehicle body end configured to face oncoming ambient airflow when the vehicle is in motion relative to a road surface; and
a splitter system having:
a splitter body arranged at the first vehicle body end, having a first splitter-body side and a second splitter-body side, and configured to generate an aerodynamic downforce on the first vehicle body end when the vehicle is in motion;

a first winglet operatively connected to the first splitter-body side and a second winglet operatively connected to the second splitter-body side, wherein each of the first and second winglets is configured to control movement of the ambient airflow relative to the splitter body;

a mechanism configured to selectively shift each of the first winglet and the second winglet in a direction transverse to the longitudinal body axis to thereby adjust a magnitude of the aerodynamic downforce generated by the splitter body on the first vehicle body end;

an electronic controller configured to regulate the mechanism; and a first sensor configured to detect a rotating speed of the road wheel and communicate the detected rotating speed of the road wheel to the controller.

9. The vehicle according to claim 8, further comprising a second sensor configured to detect a yaw rate of the vehicle body and communicate the detected yaw rate to the controller.

10. The vehicle according to claim 9, further comprising a third sensor configured to detect a velocity of ambient airflow relative to the vehicle and communicate the detected velocity of the ambient airflow to the controller.

11. The vehicle according to claim 10, further comprising a steering wheel and a fourth sensor configured to detect an angle of the steering wheel.

12. The vehicle according to claim 11, wherein the controller is configured to selectively shift, via the mechanism, at least one of the first and second winglets in a direction transverse to the longitudinal body axis during vehicle cornering in response to the detected yaw rate, the detected angle of the steering wheel, and at least one of the detected rotating speed of the road wheel and velocity of the ambient airflow, to thereby vary the aerodynamic downforce on the first vehicle body end and control the detected yaw rate.

13. The vehicle according to claim 12, wherein the controller is programmed to selectively shift, via the mechanism, at least one of the first and second winglets in a direction transverse to the longitudinal body axis according to a lookup table establishing a correspondence of magnitude of shift of each of the first winglet and the second winglet and a magnitude of the aerodynamic downforce generated by splitter on the first vehicle body end.

14. The vehicle according to claim 8, wherein the mechanism includes at least one of a linear actuator, a rotary actuator, and an electric motor.

15. A vehicle comprising:
a vehicle body arranged along a longitudinal body axis and having a first vehicle body end configured to face oncoming ambient airflow when the vehicle is in motion relative to a road surface;
a road wheel;
a steering wheel; and
a splitter system having:
a splitter body arranged at the first vehicle body end, having a first splitter-body side and a second splitter-body side, and configured to generate an aerodynamic downforce on the first vehicle body end when the vehicle is in motion;
a first winglet operatively connected to the first splitter-body side and a second winglet operatively connected to the second splitter-body side, wherein each of the first and second winglets is configured to control movement of the ambient airflow relative to the splitter body;

a mechanism configured to selectively shift each of the first winglet and the second winglet in a direction transverse to the longitudinal body axis to thereby adjust a magnitude of the aerodynamic downforce generated by the splitter body on the first vehicle body end; and an electronic controller configured to regulate the mechanism;

a first sensor configured to detect a rotating speed of the road wheel and communicate the detected rotating speed of the road wheel to the controller;

a second sensor configured to detect a yaw rate of the vehicle body and communicate the detected yaw rate to the controller;

a third sensor configured to detect a velocity of ambient airflow relative to the vehicle and communicate the detected velocity of the ambient airflow to the controller; and a fourth sensor configured to detect an angle of the steering wheel;

wherein the controller is configured to selectively shift, via the mechanism, at least one of the first and second winglets in a direction transverse to the longitudinal body axis during vehicle cornering in response to the detected yaw rate, the detected angle of the steering wheel, and at least one of the detected rotating speed of the road wheel and velocity of the ambient airflow, to thereby vary the aerodynamic downforce on the first vehicle body end and control the detected yaw rate.

16. The vehicle according to claim 15, wherein the controller is programmed to selectively shift, via the mechanism, at least one of the first and second winglets in a direction transverse to the longitudinal body axis according to a lookup table establishing a correspondence of magnitude of shift of each of the first winglet and the second winglet and a magnitude of the aerodynamic downforce generated by the splitter on the first vehicle body end.

* * * * *